US009521697B2

(12) United States Patent
Verma et al.

(10) Patent No.: US 9,521,697 B2
(45) Date of Patent: Dec. 13, 2016

(54) ROLE REVERSAL FROM WIRELESS DOCKING CENTER TO WIRELESS DOCKEE

(71) Applicant: QUALCOMM Incorporated, San Diego, CA (US)

(72) Inventors: Lochan Verma, San Diego, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/498,080

(22) Filed: Sep. 26, 2014

(65) Prior Publication Data

US 2015/0334753 A1    Nov. 19, 2015

Related U.S. Application Data

(60) Provisional application No. 61/993,998, filed on May 15, 2014.

(51) Int. Cl.
| | |
|---|---|
| *H04W 76/02* | (2009.01) |
| *H04W 76/06* | (2009.01) |
| *H04W 4/00* | (2009.01) |
| *H04W 76/04* | (2009.01) |
| *H04W 84/00* | (2009.01) |
| *H04L 12/26* | (2006.01) |
| *G06F 1/16* | (2006.01) |
| *H04W 84/12* | (2009.01) |
| *H04W 84/20* | (2009.01) |

(52) U.S. Cl.
CPC ........ *H04W 76/023* (2013.01); *H04L 43/0864* (2013.01); *H04W 4/008* (2013.01); *H04W 76/028* (2013.01); *H04W 76/043* (2013.01); *H04W 76/06* (2013.01); *G06F 1/1632* (2013.01); *H04W 84/12* (2013.01); *H04W 84/20* (2013.01)

(58) Field of Classification Search
CPC .. H04W 76/023; H04W 76/06; H04W 76/043; H04W 4/008; H04W 84/12; H04W 76/028; H04W 64/006; H04W 4/026; H04L 43/0864; G06F 1/1632; H04M 1/7253; Y02B 60/50
See application file for complete search history.

(56) References Cited

U.S. PATENT DOCUMENTS 6,549,968 B1    4/2003  Hart
7,171,221 B1    1/2007  Amin et al.
(Continued)

FOREIGN PATENT DOCUMENTS

WO    2015160588 A1    10/2015

OTHER PUBLICATIONS

Media Agnostic Universal Serial Bus Draft Specification, Verision 1.0 RC, Jan. 2014, 170 pp.
(Continued)

*Primary Examiner* — Yee Lam
(74) *Attorney, Agent, or Firm* — Shumaker & Sieffert, P.A.

(57) ABSTRACT

A device configured to manage a wireless docking environment maintains one or more communication sessions between one or more peripheral devices; determines the device is in proximity of a second device; and in response to determining the device is in proximity of the second device, relinquishes control of at least one of the one or more communication sessions to the second device.

27 Claims, 8 Drawing Sheets

(56) References Cited

U.S. PATENT DOCUMENTS

| | | |
|---|---|---|
| 8,254,992 B1 | 8/2012 | Ashenbrenner et al. |
| 8,462,734 B2 | 6/2013 | Laine et al. |
| 2002/0172336 A1 | 11/2002 | Postma et al. |
| 2005/0054335 A1 | 3/2005 | Pearson et al. |
| 2006/0026326 A1 | 2/2006 | Hunt et al. |
| 2006/0061963 A1 | 3/2006 | Schrum |
| 2008/0252419 A1* | 10/2008 | Batchelor ............. G06F 1/1632 340/10.1 |
| 2012/0099566 A1* | 4/2012 | Laine ................. H04M 1/7253 370/338 |
| 2012/0265913 A1 | 10/2012 | Suumaeki et al. |
| 2013/0343247 A1 | 12/2013 | Kasher |
| 2014/0064258 A1* | 3/2014 | Montag ................ H04W 84/12 370/338 |
| 2014/0148193 A1* | 5/2014 | Kogan ................. H04W 76/06 455/456.1 |
| 2014/0196112 A1 | 7/2014 | Huang et al. |
| 2014/0330998 A1* | 11/2014 | Dees ................ H04M 1/72527 710/303 |
| 2014/0351479 A1* | 11/2014 | Lee ....................... H04W 12/08 710/303 |
| 2015/0056920 A1* | 2/2015 | Huttunen ................ H04B 7/26 455/41.2 |
| 2015/0149679 A1* | 5/2015 | Mostafa .............. H04W 76/021 710/304 |
| 2015/0264123 A1* | 9/2015 | Smadi .................. H04L 51/046 709/206 |

OTHER PUBLICATIONS

International Search Report and Written Opinion from International Application No. PCT/US2015/026464, dated Jul. 14, 2015, 13 pp.
Response to Written Opinion dated Jul. 14, 2015, from International Application No. PCT/US2015/026464, filed on Jan. 15, 2016, 3 pp.
Second Written Opinion from International Application No. PCT/US2015/026464, dated Apr. 7, 2016, 6 pp.
International Report on Patentability—PCT/US2015/026464—IPEA—Jul. 27, 2016, 6 pages.

\* cited by examiner

ROLE REVERSAL FROM WIRELESS DOCKING CENTER TO WIRELESS DOCKEE

This application claims the benefit of U.S. Provisional Application 61/993,998 filed 15 May 2014, the entire content of which is incorporated by reference.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations typically require a physical connection between the electronic device and the docking station. Additionally, the electronic device and the docking station typically establish docking communications before docking functions may be used.

SUMMARY

This disclosure describes an architecture for wireless docking in which an incumbent wireless docking center (WDC) may relinquish its role as WDC in the presence of another WDC. The incumbent WDC may, for example, relinquish its role as WDC when it is in the presence of a WDC that is more resource-rich than the incumbent WDC.

In one example, a method of managing a wireless docking environment includes maintaining, by a first device, one or more communication sessions between one or more peripheral devices; determining if the first device is in proximity of a second device; and, in response to determining the first device is in proximity of the second device, relinquishing control of at least one of the one or more communication sessions to the second device.

In another example, a method of managing a wireless docking environment includes receiving from a device a message indicating the device is relinquishing control of at least one of one or more communication sessions between the device and one or more peripheral devices; and, in response to receiving the message, establishing one or more communication sessions between one or more peripheral devices previously controlled by the device.

In another example, a device configured to manage a wireless docking environment includes one or more processors configured to maintain one or more communication sessions between one or more peripheral devices; determine the device is in proximity of a second device; and, in response to determining the device is in proximity of the second device, relinquish control of at least one of the one or more communication sessions to the second device.

In another example, a computer-readable storage medium storing instructions that when executed by one or more processors cause the one or more processors to maintain one or more communication sessions between one or more peripheral devices and a first device; determine if the first device is in proximity of a second device; and in response to determining the first device is in proximity of the second device, relinquish control of at least one of the one or more communication sessions to the second device.

In another example, an apparatus for managing a wireless docking environment includes means for maintaining, by a first device, one or more communication sessions between one or more peripheral devices; means for determining if the first device is in proximity of a second device; and means for relinquishing control of at least one of the one or more communication sessions to the second device in response to determining the first device is in proximity of the second device.

The details of one or more examples are set forth in the accompanying drawings and the description below. Other features, objects, and advantages will be apparent from the description and drawings, and from the claims.

DETAILED DESCRIPTION

This disclosure describes an architecture for wireless docking in which an incumbent wireless docking center (WDC) may relinquish its role as WDC in the presence of another WDC. The incumbent WDC may, for example, relinquish its role as WDC when it is in the presence of a WDC that is more resource-rich than the incumbent WDC. As one example, a battery powered device (e.g. tablet, phone, or laptop) acting as a WDC may relinquish its role as WDC in the presence of a non-battery powered device that is also configured to act as a WDC (e.g. desktop computer, or television). A peripheral, such as headphones or a video screen, may stream media from the battery powered device when the battery powered device is acting as the WDC and stream the same or different media from the non-battery powered device when the non-battery powered device is the WDC. The transition from one WDC to another may be performed in a way that is transparent to a user of the devices and peripherals communicating with the devices. The techniques of this disclosure may, for example, preserve battery power in battery powered device, as well as enable peripherals to be paired with devices that offer the more robust assortment of features and applications.

Docking generally refers to a process by which a wireless dockee (WD) learns about the PFs (Peripheral functions) and other WDs advertised by a WDC, connects to the WDC and to one or all of the PFs and WDs, with a user pairing step. The term wireless dockee generally refers to a logical function in a device that makes it capable of docking. The term wireless docking center generally refers to a logical function in a device, which coordinates the setup of connection between a WD and a full set or subset of all PFs and WDs in a wireless docking environment (WDN) that it manages. A WDN generally refers to a set of peripherals and WDs managed by the WDC.

Figure 1A:
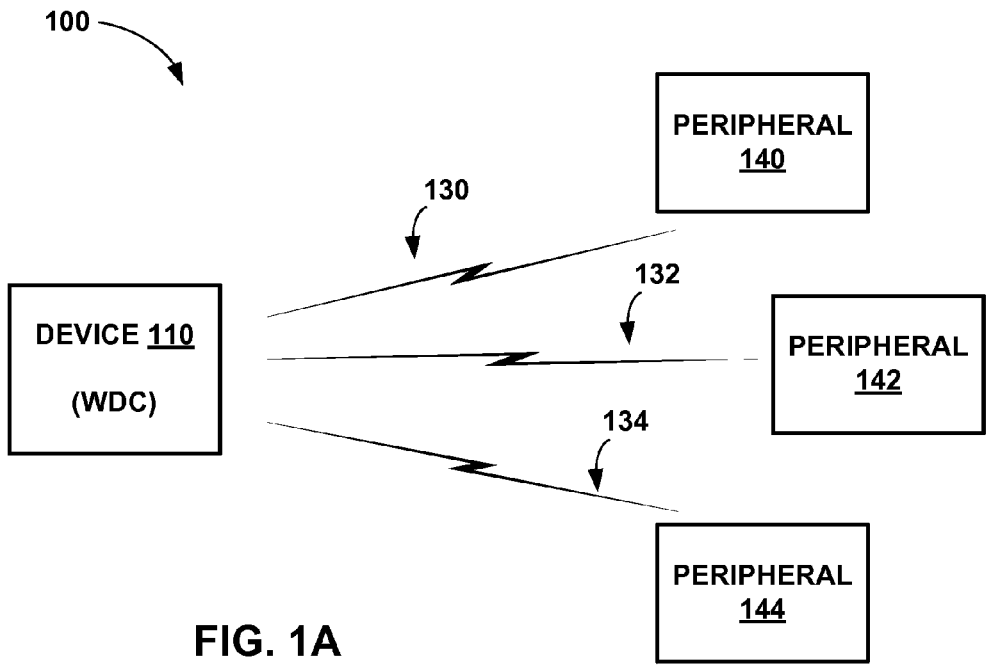
FIG. 1A is a conceptual diagram of an example wireless docking system in which a device acts as a wireless docking center using a wireless docking service to communicate with multiple peripherals over one or more wireless communication channels.

FIG. 1A is a conceptual diagram of an example wireless docking system in which a WDC uses a wireless docking service to communicate with multiple peripherals over one or more wireless communication channels. In the illustrated example, the wireless docking system 100 includes device 110 which acts as the WDC. Device 110 represents a computing device configured for wireless docking and referred to as a WDC in the context of a wireless docking system 100. Device 110 may be a mobile device such as a smartphone or other mobile handset, a tablet computer, a laptop computer, or other computing devices. The device 110 may also be a component of a larger device or system. For example, the device 110 may be a processor, a processing core, a chipset, or other one or more integrated circuits.

The peripheral devices 140, 142, 144 of the wireless docking system 100 may include displays, projectors, speakers, keyboards, mice, joysticks, data storage devices, network interface devices, other docking hosts, remote controls, cameras, microphones, printers, or any of various other devices capable of wireless communication with device 110. Different types of peripheral devices may be desirable in different environments, such as home environments, office environments, or mobile environments including environments within vehicles or other settings that may have specific peripherals for that setting. Device 110 may engage services provided by peripherals 140, 142, 144. Device 110 may couple to peripherals 140, 142, 144 via wireless communication channels to operate and/or exchange data with peripherals 140, 142, 144 in accordance with the services accessible to device 110.

Wireless communication channels 130, 132, 134 may comprise any channels capable of propagating communicative signals between device 110 and the respective peripherals 140, 142, 144. In some examples, the wireless communication channels 130, 132, 134 may be implemented in radio frequency communications in frequency bands such as the 2.4 gigahertz (GHz) band, the 5 GHz band, the 60 GHz band, or other frequency bands. In some examples, the wireless communication channels 130, 132, 134 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11 ad, etc.), or other standards, protocols, or technologies. The frequency bands used for the wireless communication channels 130, 132, 134, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols, including the Media Agnostic Universal Serial Bus (USB) Draft Specification presently under development. In some examples, the wireless communications channels 130, 132, 134 may represent a single wireless communication channel multiplexed among peripherals 140, 142, 144.

Device 110 may establish communications with any subset of the peripherals 140, 142, 144 automatically once device 110 and the subset come within operative communication range of each other, or manually in response to a user input, in different examples. Device 110 and the peripherals 140, 142, 144 may use Application Service Platform (ASP) and/or Peripheral Function Protocols (PFPs), such as WiFi Serial Bus (WSB) and Miracast, to manage communications with each other for a variety of services, including a wireless docking service (WDS).

Figure 1B:
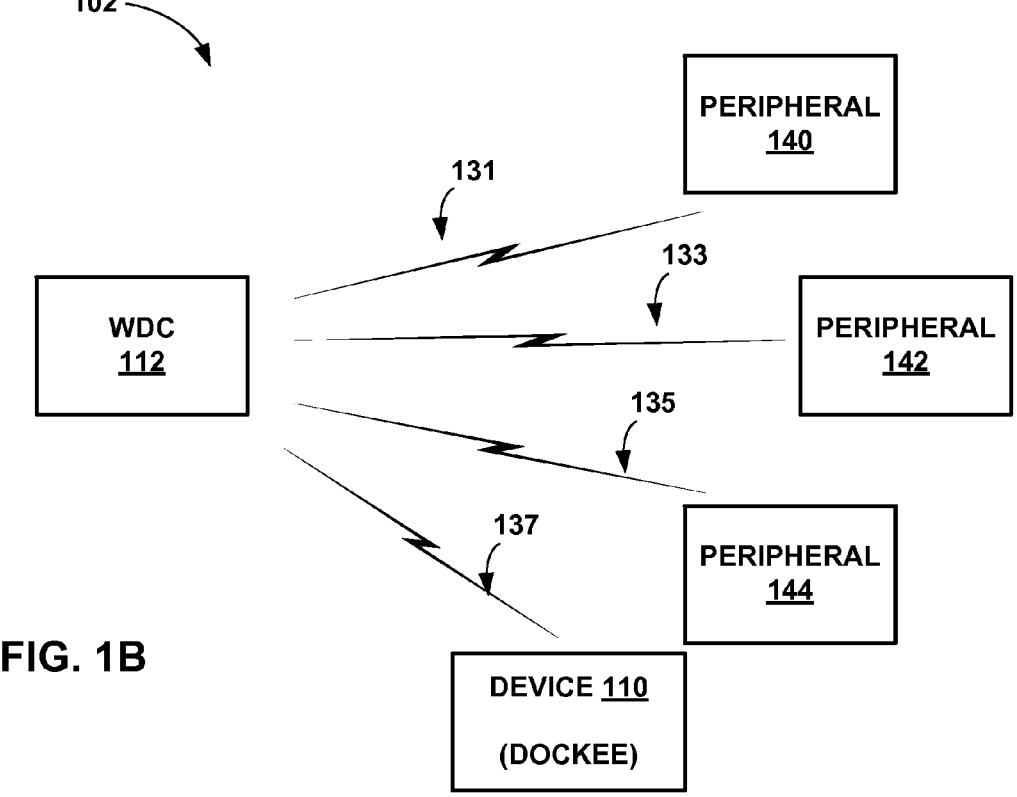
FIG. 1B is a conceptual diagram of an example wireless docking system in which the device of FIG. 1A acts as a dockee for a new wireless docking center.

FIG. 1B is a conceptual diagram of an example wireless docking system in which a WDC uses a wireless docking service to communicate with multiple peripherals over one or more wireless communication channels. In the illustrated example, the wireless docking system 102 includes WDC 112 which acts as the wireless docking center, while device 110 is now configured to act as a wireless dockee of WDC 112. WDC 112 may, for example, be a stationary device such as a desktop computer or television that has more resources (e.g. power resources) than device 110. Thus, when device 110 is in proximity to WDC 112, device 110 may relinquish its role as wireless docking center to WDC 112. In one example use scenario, device 110 may act as WDC, as in FIG. 1A, while device 110 and peripherals 140, 142, and 144 are outside of a home or office and away from WDC 112, but once device 110 returns to the home or office and is within proximity of WDC 112, device 110 may relinquish the role of wireless docking center to WDC 112.

WDC 112 represents a computing device configured for wireless docking and referred to as a wireless docking center in the context of a wireless docking system 102. With WDC 112 setup as wireless docking center, WDC 112 may engage services provided by peripherals 140, 142, 144, and device 110. WDC 112 may couple to peripherals 140, 142, 144 via wireless communication channels to operate and/or exchange data with peripherals 140, 142, 144 in accordance with the services accessible to WDC 112.

Wireless communication channels 131, 133, 135, and 137 generally represent the same types of communication channels as wireless communication channels 130, 132, 134, but represent communication channels between WDC 112 and peripherals 140, 142, 144, and device 110 instead of between device 110 and peripherals 140, 142, and 144. Wireless communication channels 131, 133, 135, and 137 may be any channels capable of propagating communicative signals between WDC 112 and the respective peripherals 140, 142, 144 and device 110. In some examples, the wireless communication channels 131, 133, 135, and 137 may be implemented in radio frequency communications in frequency bands such as the 2.4 gigahertz (GHz) band, the 5 GHz band, the 60 GHz band, or other frequency bands. In some examples, the wireless communication channels 131, 133, 135, and 137 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used for the wireless communication channels 130, 132, 134, such as the 2.4 GHz, 5 GHz, and 60 GHz bands, may be defined for purposes of this disclosure as they are understood in light of the standards of Wi-Fi, WiGig, any one or more IEEE 802.11 protocols, and/or other applicable standards or protocols. In some examples, the wireless communications channels 131, 133, 135, and 137 may represent a single wireless communication channel multiplexed among peripherals 140, 142, 144, and device 110.

WDC 112 may establish communications with any subset of the peripherals 140, 142, 144, and device 110 automatically once WDC 112 and the subset come within operative communication range of each other, or manually in response to a user input, in different examples. WDC 112 and the peripherals 140, 142, 144 may use Application Service Platform (ASP) and/or Peripheral Function Protocols (PFPs), such as WiFi Serial Bus (WSB) and Miracast, to manage communications with each other for a variety of services, including a wireless docking service (WDS).

In the example FIG. 1A, device 110 maintains one or more communication sessions between one or more peripheral devices (140, 142, 144). In response to determining it is in proximity of WDC 112, device 110 relinquishes control of at least one of the one or more communication sessions to WDC 112, as shown in FIG. 1B. Device 110 may, for example, determine that is in proximity of WDC 112 by determining a signal strength of a signal received from WDC 112, determining a round trip time for a signal sent to WDC 112, determining a position for itself and\or WDC 112 using a positioning system, and\or by some other means. As part of relinquishing control\ of at least one of the one or more communication sessions, device 110 may send a message to WDC 112 indicating that device 110 is relinquishing control of the at least one of the one or more communication sessions to WDC 112. As part of relinquishing control of at least one of the one or more communication sessions, device 110 may send a termination time to WDC 112. The termination time may, for example, indicate that device 110 has terminated a communication session or plans to terminate a communication session, and that WDC 112 may initiate a new communication session. In response to determining that device 110 is in proximity of WDC 112 and determining a communication session with one of peripherals 140, 142, or 144 is active, device 110 may maintain control of the communication session with the peripheral. Device 110 may, for example, maintain the communication session so as to not disrupt a user experience. Once the communication session is no longer active, device 110 may then terminate the communication session. In response to determining that device 110 is out of proximity of WDC 112, device 110 may reestablish new communication sessions between at least one of the one or more peripheral devices. In other words, device 110 may revert back from being a dockee, as shown in FIG. 1B, to being a WDC, as shown in FIG. 1A.

Figure 2A:
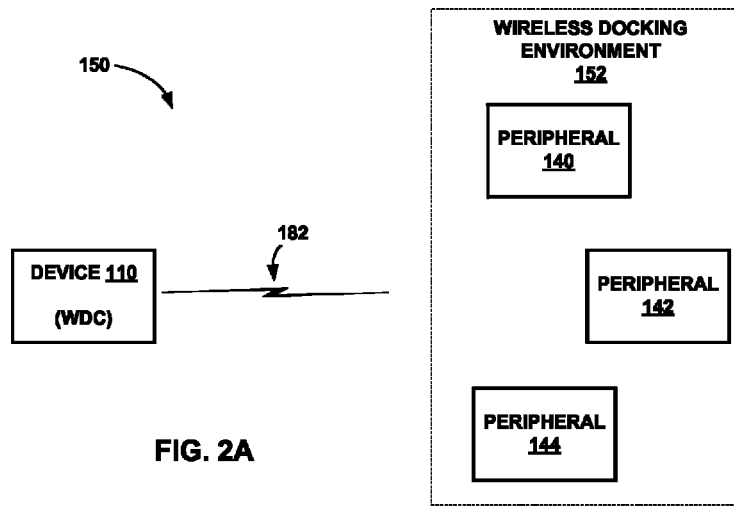
FIG. 2A is a conceptual diagram illustrating an example wireless docking system in which a wireless docking center uses a wireless docking service to create and use or discover and use a wireless docking environment that includes one or more peripheral devices.

FIG. 2A is a conceptual diagram illustrating an example wireless docking system in which a WDC (e.g. device 110) uses a wireless docking service to create and use or discover and use a wireless docking environment that includes one or more peripheral devices. In the illustrated example, the wireless docking system 150 includes the device 110 functioning as a WDC and the peripherals 140, 142, 144 which may correspond to device 110 and the peripherals 140, 142, 144 of FIG. 1A.

In some examples, device 110 uses a wireless docking service to create a wireless docking environment (WDN) 152 that includes the peripherals 140, 142, 144. In some examples, device 110 uses the wireless docking service to discover the wireless docking environment 152 already created by device 110 or another WDC. Device 110 may use the wireless docking service to select the WDN 152 to establish a wireless docking session by which device 110 may engage services provided by the peripherals 140, 142, 144. Device 110 may couple to the WDN 152 via the wireless communication channel 182 to operate and/or exchange data with the peripherals 140, 142, 144 in accordance with services accessible to device 110. The wireless communication channel 182 may be similar to any of the wireless communication channels 130, 132, 134 of FIG. 1A.

Figure 2B:
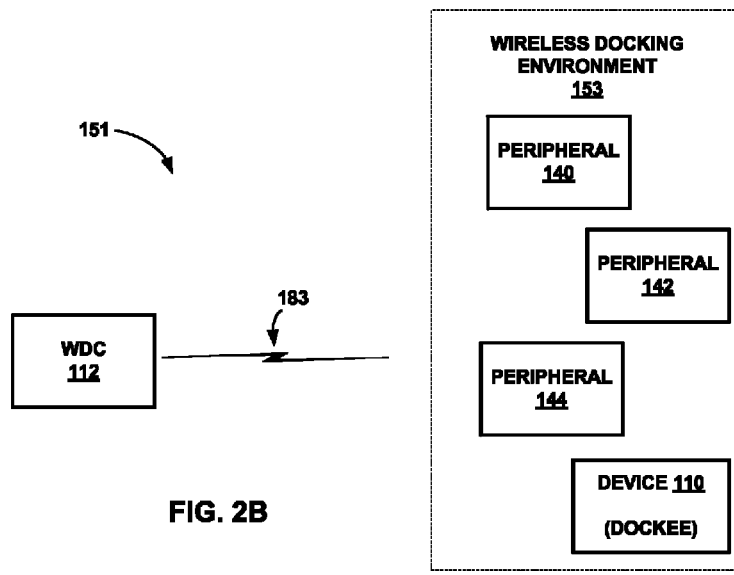
FIG. 2B is a conceptual diagram of an example wireless docking system in which the device of FIG. 2A acts as a dockee for a new wireless docking center.

FIG. 2B is a conceptual diagram illustrating an example wireless docking system in which a WDC (e.g. WDC 112) uses a wireless docking service to create and use or discover and use a wireless docking environment that includes one or more peripheral devices. In the illustrated example, the wireless docking system 151 includes the WDC 112 and the peripherals 140, 142, 144, and device 110. As in the example of FIG. 1B above, in the example of FIG. 2B, device 110 has relinquished its roles as wireless docking center WDC 112.

In some examples, the WDC 112 uses a wireless docking service to create a wireless docking environment (WDN) 153 that includes the peripherals 140, 142, 144,a and device 110. In some examples, the WDC 112 uses the wireless docking service to discover the wireless docking environment 153 already created by the WDC 112 or another wireless docking center. The WDC 112 may use the wireless docking service to select the WDN 153 to establish a wireless docking session by which the WDC 112 may engage services provided by the peripherals 140, 142, 144, and device 110. The WDC 112 may couple to the WDN 153 via the wireless communication channel 183 to operate and/or exchange data with the peripherals 140, 142, 144, and device 110 in accordance with services accessible to the WDC 112. The wireless communication channel 183 may be similar to any of the wireless communication channels 130, 132, 134 of FIG. 1.

In the examples of FIGS. 1A-1B and 2A-2B, device 110 and the WDC 112 may use a wireless docking service to consolidate connections with one or more peripherals into a common context, or "docking session," that may be used by one or more application(s) executing on WDC 112 or device 110 to easily connect to and use the peripherals.

Figure 3:
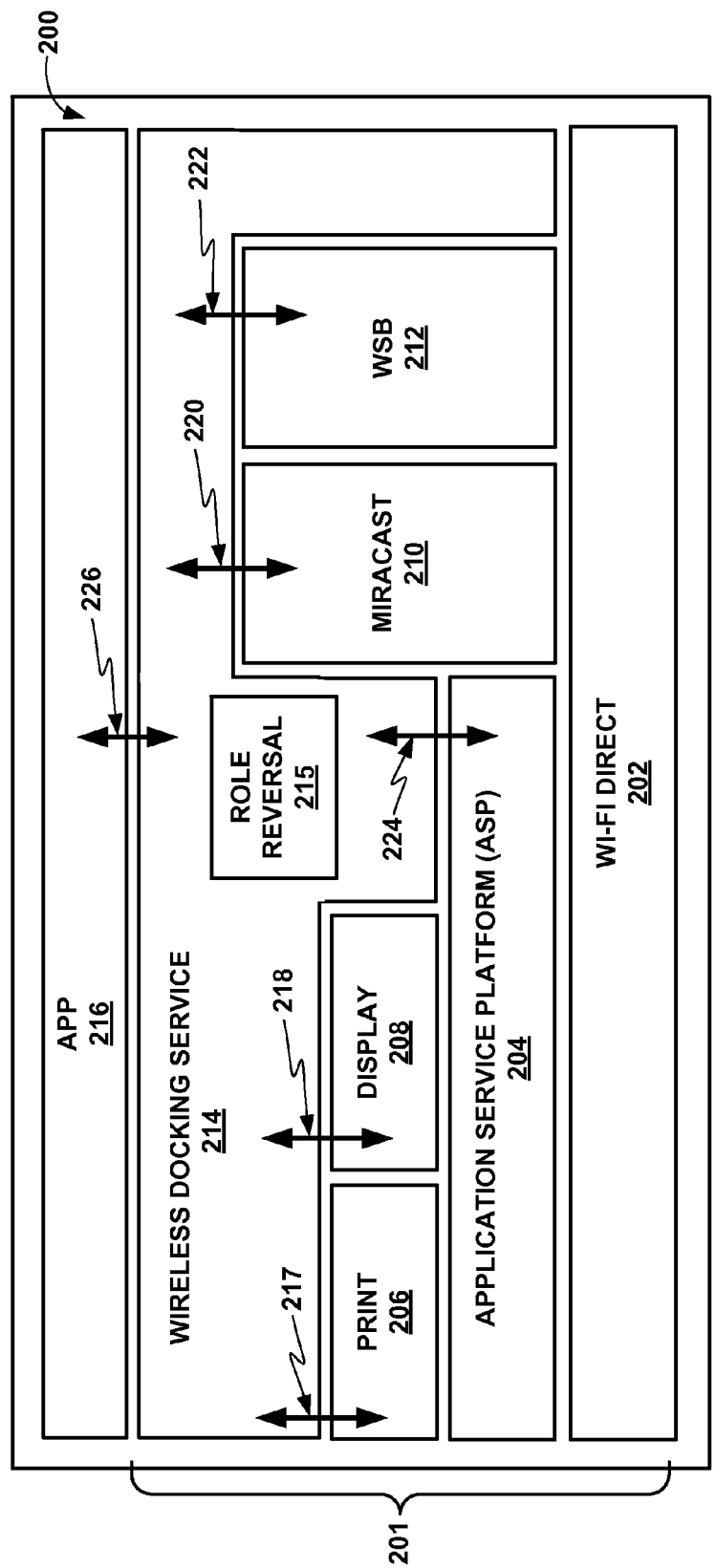
FIG. 3 is a conceptual diagram illustrating an example wireless docking communications stack that includes a wireless docking service by which a wireless docking center may communication with one or more peripheral devices.

FIG. 3 is a conceptual diagram illustrating an example wireless docking communications stack that includes a wireless docking service. In the illustrated example, the computing device 200 includes a user application 216 executing over a wireless docking communications stack 201. The computing device 200 may represent device 110 when functioning as a WDC as in FIG. 1A or 2A or may represent WDC 112 of FIGS. 1B and 2B. The wireless docking communications stack 201 includes a wireless docking service 214 that provides an application programming interface (API) 226 to the user application 216. The API 226 includes methods, data fields, and/or events by which the user application 216 may discover, configure, and select peripherals for use by the device 110 or WDC 112. In some examples, the API 226 includes an interface by which the user application 216 may create and/or discover WDNs that include peripherals for selection and use by device 110 or WDC 112. Reference herein to "methods," "messages," and "signals," for instance, with respect to communication between different layers of a communication stack, should be considered interchangeable in that each of these different constructs may be used by the layers of a communication stack to provide/receive data, request an action or data or respond accordingly, or to send/receive a command. The methods, messages, and signals described may represent any of a number of different forms of communication, including messaging services, shared memory, pipes, network communication, and so forth.

In some example implementations, the API 226 includes the example methods of Table 1.

TABLE 1

Example Application Programming Interface

| Method | Parameters | Returns |
| --- | --- | --- |
| DiscoverPeripherals( ) | None | [peripherals] |
| ConfigurePeripherals( ) | subset of [peripherals] | None |
| UsePeripherals( ) | subset of [peripherals] | [docking session] |
| CreateWDN( ) | subset of [peripherals] | [WDN handle] |
| DiscoverWDN( ) | None | [WDN handles] |
| UseWDN( ) | [docking session] | [docking session] |
| Undock | [docking session] | None |

Accordingly, the user application 216 may use the API 226 to direct the wireless docking service 214 to discover ("DiscoverPeripherals"), configure ("ConfigurePeripherals"), and directly select ("UsePeripherals") peripherals to establish a docking session, as well as to undock a docking session ("Undock"). Alternatively, or in addition, the user application 216 may use the API 226 to direct the wireless docking service 214 to create a wireless docking environment ("CreateWDN") from a set of peripherals, discover an existing WDN ("DiscoverWDN"), and select a WDN that includes peripherals for use ("UseWDN").

Wireless docking is implemented as a wireless docking service (WDS) 214 operating over a wireless Application Service Platform layer 204 ("ASP 204") operating over Wi-Fi Direct wireless communications layer 202 ("Wi-Fi Direct 202"), in this example. The Wi-Fi Direct communications 202 are an example implementation of wireless communications over which the ASP 204 may operate.

Various wireless services may be enabled as interface layers over the ASP 204, including a Print service 206, a Display service 208, and other services in some examples. The wireless docking service 214 operates over each of the Print service 206 and the Display service 208 to provide an interface with the user application 216. The Print service 206 and the Display service 208 may be provided by one or more peripheral devices directly accessible to the computing device 200 and managed via the ASP communication layer 204 in some examples.

The WDS 214 may be provided as a Wi-Fi Direct service, and referred to as a Wi-Fi Direct Docking Service. The Wi-Fi Direct Docking Service can be a subset of Wi-Fi docking, in particular, a subset of Wi-Fi docking operating over a P2P Wi-Fi Direct topology, in the example of a Wi-Fi Direct implementation. The WDS 214 may, for example, be implemented as a software module that may be loaded onto or stored in a device such as device 110 or WDC 112. Aspects of the WDS 214 may also be integrated with, pre-packaged with, or implemented in hardware in some examples. For example, the WDS 214 may be stored on, integrated with, or implemented by an integrated circuit or a chipset containing one or more integrated circuits and one or more memory components.

A packet-based transport layer protocol stack (not illustrated) may run on top of ASP 204, Miracast 210, and/or WiFi Serial Bus (WSB) 212. The packet-based transport layer may include an Internet Protocol (IP) communications layer and one or more of various Transport Layer communication layers. The IP communications layer may run on top of ASP 204, or directly on Wi-Fi Direct 202. The Transport Layer communications layer may include and one or more of Transmission Control Protocol (TCP), User Datagram Protocol (UDP), Stream Control Transmission Protocol (SCTP), or other Transport Layer communication protocols.

The wireless communications stack 201 includes several additional communication interfaces between different components of the wireless communications stack 201. A WDS Interface 224 between ASP 204 and the WDS 214 serves as a wireless docking interface for ASP methods and events. The WDS Interface 224 may implement WDS 214 running directly on ASP 204 to manage wireless docking communications directly with one or more peripherals.

Various other communication interfaces are also included in wireless docking communications stack 201. Communication interface 220 between Miracast 210 and WDS 214 serves as an interface for controlling and using Miracast operations. Communication interface 222 between WiFi Serial Bus (WSB) 212 and WDS 214 serves as an interface for controlling and using WiFi Serial Bus operations. Communication interface 217 between the Print service 206 and the WDS 214 serves as an interface for controlling and using the Print service 206 operations. Communication interface 218 between the Display service 208 and the WDS 214 serves as an interface for controlling and using Display service 208 operations.

WDS 214 includes role reversal module 215, which may be configured to implement the role reversal techniques described in this disclosure. As introduced above, WDS 214 may maintain one or more communication sessions between one or more peripheral devices. As described above, role reversal module 215 may be configured to determine if computing device 200 is in proximity of another WDC device. If computing device 200 is operating as a WDC and comes in proximity of another device acting as a WDC, role reversal module 215 may implement the relinquishing of computing device 200's role as a WDC to the other WDC device. If computing device 200 is operating as a wireless dockee of a WDC device and leaves the proximity of the WDC device, then role reversal module 215 may implement the establishment of computing device 200 as a WDC. Role reversal module 215 may, for example, determine that computing device 200 is in proximity of another WDC device by one or more of determining a signal strength of a signal received from the other WDC device, determining a round trip time for a signal sent to the other WDC device, determining a position for itself and\or the WDC device using a positioning system, and\or by some other means.

Figure 4:
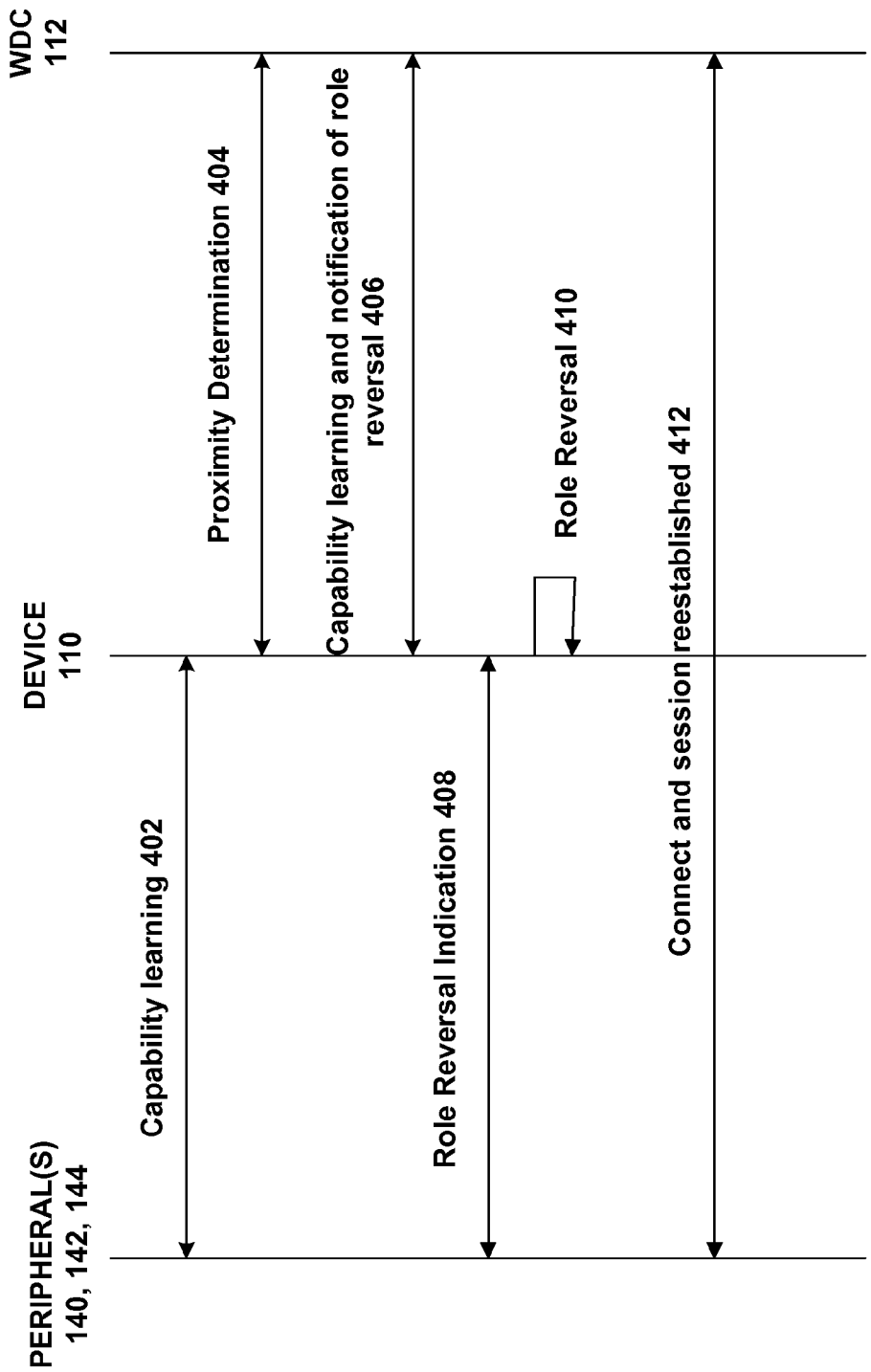
FIG. 4 shows a sequencing of operations for a device relinquishing its role as a wireless docking center to another device.

FIG. 4 shows a sequencing of operations for device 110 to relinquish its role as a wireless docking center to WDC 112. In the example of FIG. 4, device 110 is maintaining a wireless docking session with one or more of peripherals 140, 142, and 144. In operation 402, device 110 learns the capabilities of peripherals 140, 142, and 144. Device 110 may, for example, learn the capabilities of peripherals 140, 142, and 144 by peripherals 140, 142, and 144 advertising the capability to handle the role reversal behavior executed by device 110. This advertisement may be done either pre-association with device 110 or post-association with device 110. As part of capability learning operation 402, device 110 may determine if peripherals 140, 142, and 144 are compatible with WDC 112. If peripherals 140, 142, and 144 are not compatible with WDC 112, device 110 may not relinquish its role as a WDC relative to that specific peripheral but may still relinquish its role for other peripherals.

As part of capability learning operation 402, device 110 may advertise information such as support for role reversal behavior, a resource availability index, and availability. In this context, role reversal behavior generally refers to attributes indicating whether the behavior of role reversal is implemented. For example, if set to 1, resource availability index and availability attribute values are not reserved. If set to 0, resource availability index and availability attribute values are reserved. In this context a resource availability index may generally refer to an indication of the amount of resources available to device 110 or WDC 112 at the time role reversal is being contemplated. A resource may, for example, refer to a tuple, which comprises one or more of whether a device is plugged into a power supply, an amount of remaining battery life, memory availability, CPU utilization, available bandwidth (e.g. Mb/s), etc. The tuple may also include additional characteristics. Power supply set to 0, indicates the device is AC powered and set to 1 indicates battery powered. Remaining Battery life carries the value of battery life in percentage (0-100) and is reserved when power supply is set to 0. CPU utilization is represented in percentage (0-100). Resource availability index is an integer value (0-10) calculated through this tuple. A higher value, or in some implementations a lower value, for a resource availability index may represent richness in resources.

In some examples, the resource availability index may be user customizable, such that a user can control when role reversal is performed and when it is not. As one example, a user may configure a role reversal module (e.g. role reversal module 215) of device 110 or WDC 112 to only perform role reversal if the resource availability index for device 110 is below a certain threshold. In other examples, a user may configure role reversal module to perform role reversal any time device 110 is acting as a WDC and comes into proximity of WDC 112.

WDC 112 may advertise its availability. As one example, an availability flag may be set to 0 to indicate that WDC 112 is unavailable to perform role reversal behavior. Otherwise, WDC 112 may set the availability flag to 1 to indicate that WDC 112 is available to perform role reversal.

In operation 404, device 110 determines whether it is in proximity of WDC 112. If device 110 is not in proximity of WDC 112, then device 110 continues to act as a WDC. If device 110 is in proximity of WDC 112, then device 110 performs operation 406 ("capability learning and notification of role reversal"). Operation 406 may, for example, involve a three-way handshake (REQUEST, RESPONSE, and Notification). As part of operation 406, device 110 sends requests to WDC 112 to provide information on, for example, (i) support for role reversal behavior, (ii) resource availability index, and (iii) availability (e.g. status, willing to accept). This request may also carry information about device 110 attributes, such as (i) support for role reversal behavior, (ii) resource availability index, and (iii) availability.

As part of operation 406, WDC 112 may also send a response containing, for example, (i) support for role reversal behavior, (ii) resource availability index, and (iii) availability of WDC 112 to device 110 after receiving the request from device 110. WDC 112 may set a STATUS field in the response message to "SUCCESS" based on local logic such as a comparison of one or more attributes. If WDC 112 resource availability index is equal to device 110 resource availability index, then tie-breaking can be done based on supplemental information such as a tie-breaker bit, etc. As part of operation 410, device 110 may send a notification to WDC 112 confirming the role reversal. The notification message may include, for example, device and service information about one or more peripherals, session information about each peripheral, and termination time when device 110 ceases operation.

After completion of operation 406, in instances where operation 406 was successful, device 110 may initiate operation 408 ("role reversal indication"). As part of operation 408, device 110 may advertise to peripherals 140, 142, and 144 about the role reversal event in the future. For example, device 110 may broadcast an INDICATION message, which contains (i) a future timestamp (e.g. when reversal will happen), (ii) WDC 112 connection information (e.g. name of WDC 112 and other info), and (iii) a list of peripherals that should connect to WDC 112 (peripheral looks for its name). If, for example, DEVICE 110 has an active session with a peripheral, that peripheral may not be on the list.

In operation 410, device 110 may perform role reversal, in which case it will relinquish its role as a WDC relative to at least one of peripheral 140, 142, and 144. In operation 412, one or more of peripherals 140, 142, and 144 may leverage the connection information provided in operation 408 to connect and reestablish sessions through WDC 112.

Figure 5:
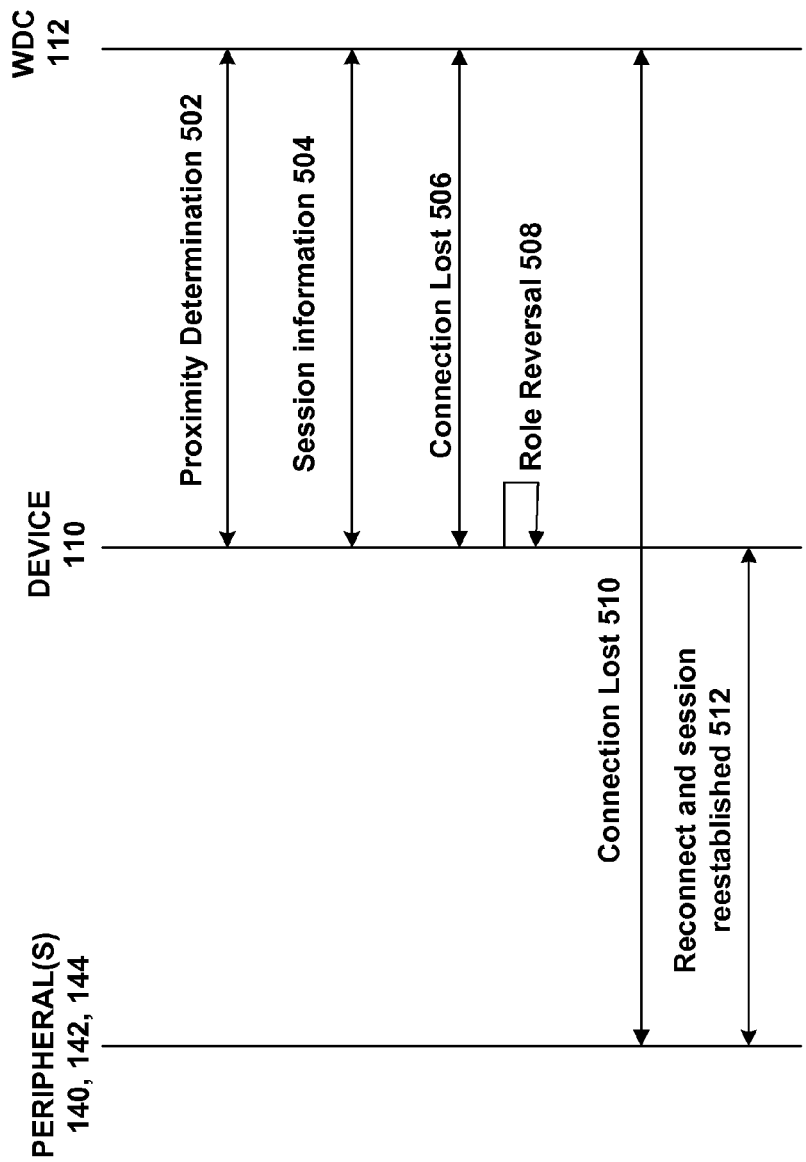
FIG. 5 shows a sequencing of operations for a device reclaiming its role as a wireless docking center from another device.

FIG. 5 shows a sequencing of operations for device 110 reclaiming its role as a wireless docking center from WDC 112. In the example of FIG. 5, WDC 112 is maintaining a wireless docking session with one or more of peripherals 140, 142, and 144, and potentially, with device 110 as well. In operation 502, device 110 determines, for example, that separation between itself and WDC 112 is increasing. At a certain threshold separation value, device 110 commences operation 504. As part of operation 504, device 110 requests WDC 112 to provide session information about peripherals connected to WDC 112. As part of operation 506, once device 110 is not in vicinity of WDC 112 anymore, device 110 takes back its role as WDC, reversing its role from dockee to WDC (operation 508). Meanwhile peripherals 140, 142, and 144 may have also moved out of vicinity of WDC 112 and may have lost their connection to WDC 112. As part of operation 512, peripherals reconnect to device 110 using the connection information they had from the previous connection. Device 110 restores the sessions of peripherals based on the information it received as part of operation 504.

Figure 6:
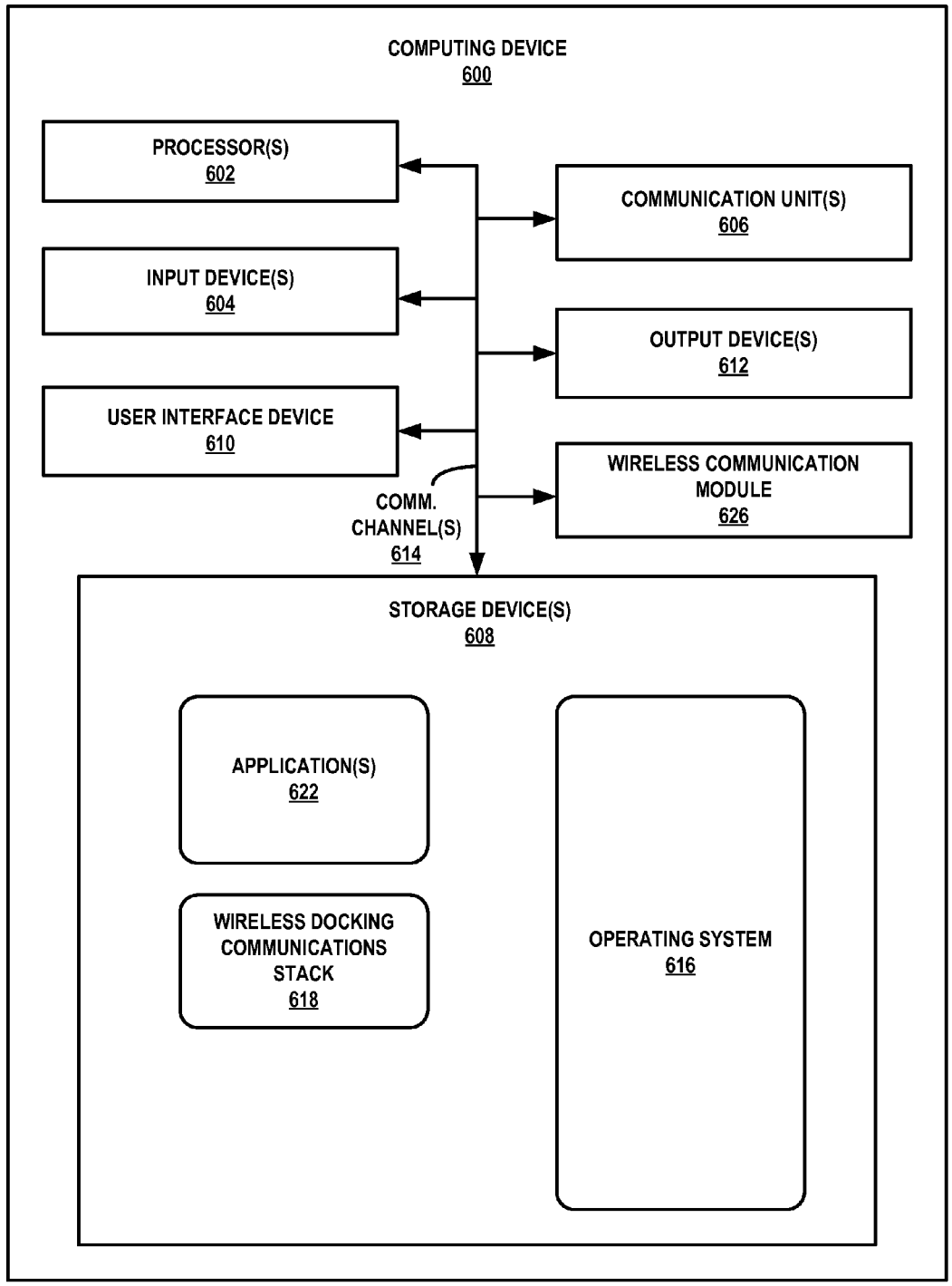
FIG. 6 is a block diagram illustrating an example instance of a computing device operating according to techniques described in this disclosure.

FIG. 6 is a block diagram illustrating an example instance of a computing device 200 operating according to techniques described in this disclosure. FIG. 6 illustrates only one particular example of computing device 200, and other examples of computing device 200 may be used in other instances. Although shown in FIG. 6 as a stand-alone computing device 200 for purposes of example, a computing device may be any component or system that includes one or more processors or other suitable computing environment for executing software instructions and, for example, need not necessarily include one or more elements shown in FIG. 6 (e.g., input devices 604, user interface devices 610, output devices 612).

As shown in the specific example of FIG. 6, computing device 600 includes one or more processors 602, one or more input devices 604, one or more communication units 606, one or more output devices 612, one or more storage devices 608, and user interface (UI) device 610, and wireless communication module 626. Computing device 600, in one example, further includes wireless docking communications stack 618, authorization module 620, one or more applications 622, and operating system 616 that are executable by computing device 600. Each of components 602, 604, 606, 608, 610, 612, and 626 are coupled (physically, communicatively, and/or operatively) for inter-component communications. In some examples, communication channels 614 may include a system bus, a network connection, an inter-process communication data structure, or any other method for communicating data. As one example in FIG. 6, components 602, 604, 606, 608, 610, 612, and 626 may be coupled by one or more communication channels 614. Wireless docking communications stack 618, authorization module 620, and one or more applications 622 may also communicate information with one another as well as with other components in computing device 600. While illustrated as separate modules, any one or more of modules 618 or 620 may be implemented as part of any of applications 622.

Processors 602, in some examples, are configured to implement functionality and/or process instructions for execution within computing device 600. For example, processors 602 may be capable of processing instructions stored in storage device 608. Examples of processors 602 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 608 may be configured to store information within computing device 600 during operation. Storage device 608, in some examples, is described as a computer-readable storage medium. In some examples, storage device 608 is a temporary memory, meaning that a primary purpose of storage device 608 is not long-term storage. Storage device 608, in some examples, is described as a volatile memory, meaning that storage device 608 does not maintain stored contents when the computer is turned off. Examples of volatile memories include random access memories (RAM), dynamic random access memories (DRAM), static random access memories (SRAM), and other forms of volatile memories known in the art. In some examples, storage device 608 is used to store program instructions for execution by processors 602. Storage device 608, in one example, is used by software or applications running on computing device 600 to temporarily store information during program execution.

Storage devices 608, in some examples, also include one or more computer-readable storage media. Storage devices 608 may be configured to store larger amounts of information than volatile memory. Storage devices 608 may further be configured for long-term storage of information. In some examples, storage devices 608 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 600, in some examples, also includes one or more communication units 606. Computing device 600, in one example, utilizes communication unit 606 to communicate with external devices via one or more networks, such as one or more wireless networks. Communication unit 606 may be a network interface card, such as an Ethernet card, an optical transceiver, a radio frequency transceiver, or any other type of device that can send and receive information. Other examples of such network interfaces may include Bluetooth, 4G and Wi-Fi radios computing devices as well as Universal Serial Bus (USB). In some examples, computing device 600 utilizes communication unit 606 to wirelessly communicate with an external device such as a server.

In addition, the computing device 600 may include wireless communication module 626. As described herein, wireless communication module 626 may be active hardware that is configured to communicate with other wireless communication devices. These wireless communication devices may operate according to Bluetooth, Ultra-Wideband radio, Wi-Fi, or other similar protocols. In some examples, wireless communication module 626 may be an external hardware module that is coupled with computing device 600 via a bus (such as via a Universal Serial Bus (USB) port). Wireless communication module 626, in some examples, may also include software which may, in some examples, be independent from operating system 616, and which may, in some other examples, be a sub-routine of operating system 616.

Computing device 600, in one example, also includes one or more input devices 604. Input device 604, in some examples, is configured to receive input from a user through tactile, audio, or video feedback. Examples of input device 604 include a presence-sensitive display, a mouse, a keyboard, a voice responsive system, video camera, microphone or any other type of device for detecting a command from a user.

One or more output devices 612 may also be included in computing device 600. Output device 612, in some examples, is configured to provide output to a user using tactile, audio, or video stimuli. Output device 612, in one example, includes a presence-sensitive display, a sound card, a video graphics adapter card, or any other type of device for converting a signal into an appropriate form understandable to humans or machines. Additional examples of output device 612 include a speaker, a cathode ray tube (CRT) monitor, a liquid crystal display (LCD), or any other type of device that can generate intelligible output to a user. In some examples, user interface (UI) device 610 may include functionality of input device 604 and/or output device 612.

Computing device 600 may include operating system 616. Operating system 616, in some examples, controls the operation of components of computing device 600. For example, operating system 616, in one example, facilitates the communication of wireless docking communications stack 618, and application 622 with processors 602, communication unit 606, storage device 608, input device 604, user interface device 610, wireless communication module 626, and output device 612. Wireless docking communications stack 618 and application 622 may also include program instructions and/or data that are executable by computing device 600. As one example, modules 618, 620, and 622 may include instructions that cause computing device 600 to perform one or more of the operations and actions described in the present disclosure. Wireless docking communications stack 618 and application 622 may represent wireless docking communications stack 201 and application 216 of FIG. 3, for example.

Figure 7:
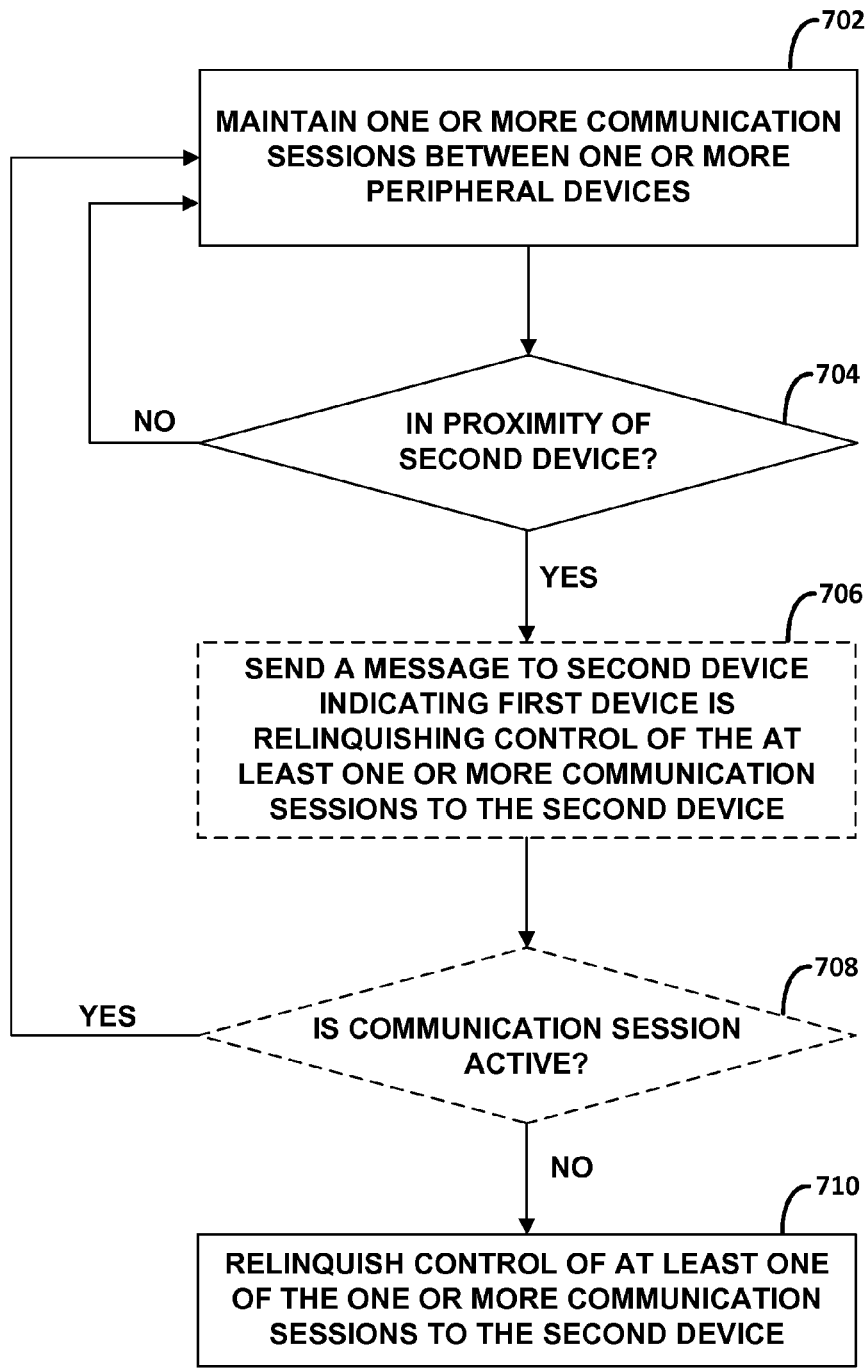
FIG. 7 is a flowchart illustrating an example method according to the techniques of this disclosure for managing a wireless docking environment.

FIG. 7 is a flowchart illustrating an example method according to the techniques of this disclosure for managing a wireless docking environment. The techniques of FIG. 7 will generally be described with reference to generic first and second devices. The first device may, for example, correspond to device 110 of FIGS. 1 and 2, and the second device may, for example correspond to WDC 112 of FIGS. 1 and 2. Unless stated to the contrary, it should be assumed that the various features described with reference to FIG. 7 may be used in conjunction with one another are not alternatives.

A first device maintains one or more communication sessions between one or more peripheral devices (702). For example, the first device may comprise a smartphone, tablet computer, laptop computer, or other mobile device that includes a central processing unit (CPU) capable of use with one or more peripheral device. The one or more peripheral devices may, for example, correspond to peripherals 140, 142, and 144 of FIGS. 1 and 2. The first device may periodically check to determine if it is in proximity of a second device (704). The first device may, for example, determine if the first device is in proximity of the second device by doing one or more of determining a signal strength of a signal received from the second device, determining a round trip time for a signal sent to the second device, and determining a position of the first device using a positioning system.

If the first device is not in proximity of the second device (704, no), then the first device continues to maintain the one or more communication sessions between the one or more peripheral devices (702). In response to determining the first device is in proximity of the second device (704, yes), the first devices may relinquish control of at least one of the one or more communication sessions to the second device (708). Prior to relinquishing control of the at least one of the one or more communication sessions to the second device, the first device may optionally send a message to the second device indicating the first device is relinquishing control of the at least one of the one or more communication sessions to the second device (706). The message sent to the second device may, for example, be or include a termination time.

Prior to relinquishing control of the at least one of the one or more communication sessions to the second device, the first device may optionally determine if one or more communication sessions are active (708). If one or more communication sessions are active (708, yes), then the first device may maintain control of the one or more communication sessions (702) until they are no longer active. If one or more communication sessions are not active (708, no), then the first device may relinquish control of the one or more communication sessions to the second device (710). In some examples, the first device may continue to maintain only the active communication sessions and relinquish control of non-active communication sessions. Then when the active communication sessions are no longer, the first device may relinquish control of those communication sessions. Alternatively, the first device may continue to maintain control of all communication sessions until all are non-active. In some examples, in response to determining the first device is out of proximity of the second device, the first device may reestablish a new communication sessions between at least one of the one or more peripheral devices.

Figure 8:
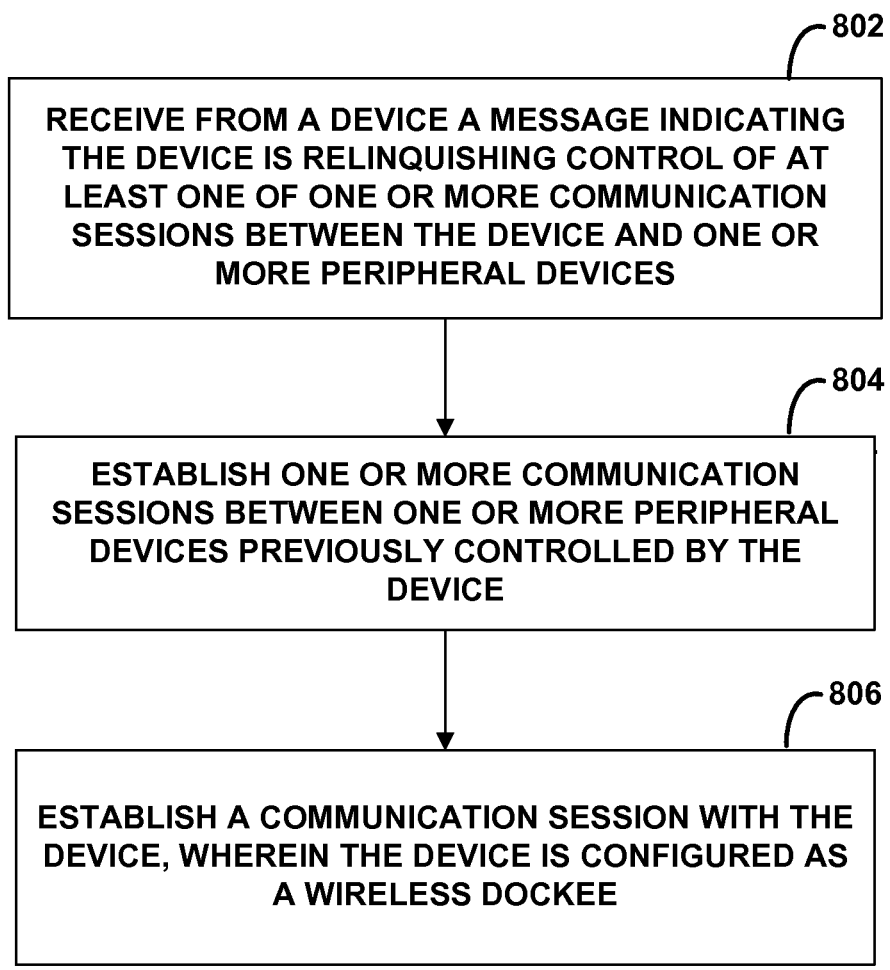
FIG. 8 is a flowchart illustrating an example method according to the techniques of this disclosure for managing a wireless docking environment.

FIG. 8 is a flowchart illustrating an example method according to the techniques of this disclosure for managing a wireless docking environment. The techniques of FIG. 8 will generally be described with reference to generic first and second devices. The first device may, for example, correspond to device 110 of FIGS. 1 and 2, and the second device may, for example correspond to WDC 112 of FIGS. 1 and 2. Unless stated to the contrary, it should be assumed that the various features described with reference to FIG. 8 may be used in conjunction with one another are not alternatives.

The second device receives from the first device a message indicating the first device is relinquishing control of at least one of one or more communication sessions between the first device and one or more peripheral devices (802). In response to receiving the message, the second device establishes one or more communication sessions between one or more peripheral devices previously controlled by the first device (804). The second device may also establish a communication session with the first device where the first device is configured as a wireless dockee (806).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, Flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of managing a wireless docking environment, the method comprising:
    maintaining, by a first device, one or more communication sessions between one or more peripheral devices;
    determining if the first device is in proximity of a second device;
    receiving from the second device a resource availability index;
    comparing the resource availability index of the second device to a resource availability index of the first device;
    in response to determining the first device is in proximity of the second device and based on the comparison of the resource availability index of the first device to the resource availability index of the second device, relinquishing control of at least one of the one or more communication sessions to the second device.

2. The method of claim 1, wherein determining the first device is in proximity of the second device comprises determining a signal strength of a signal received from the second device.

3. The method of claim 1, wherein determining the first device is in proximity of the second device comprises determining a round trip time for a signal sent to the second device.

4. The method of claim 1, wherein determining the first device is in proximity of the second device comprises determining a position of the first device using a positioning system.

5. The method of claim 1, the method further comprising:
    sending a message to the second device indicating the first device is relinquishing control of the at least one of the one or more communication sessions to the second device.

6. The method of claim 1, further comprising:
    sending a termination time to the second device.

7. The method of claim 1, further comprising:
    in response to determining the first device is in proximity of the second device and determining a communication session with a first peripheral device is active, maintaining control of the communication session with the first peripheral device after relinquishing control of a second peripheral device.

8. The method of claim 1, further comprising:
    in response to determining the first device is out of proximity of the second device, reestablishing a new communication session between the first device and at least one of the one or more peripheral devices.

9. The method of claim 1 wherein the resource availability index of the second device is determined based on one or more of an indication of if the second device is plugged into a power supply, an amount of remaining battery life, memory availability, central processing unit (CPU) utilization, and available bandwidth of the second device.

10. The method of claim 1, wherein the first device comprises a first wireless docking center (WDC), and wherein the second device comprises a second WDC.

11. A device configured to manage a wireless docking environment, the device comprising:
    a memory; and
    one or more processors configured to:
        maintain one or more communication sessions between one or more peripheral devices;
        determine the device is in proximity of a second device;
        receive from the second device a resource availability index;
        compare the resource availability index of the second device to a resource availability index of the first device;
        in response to determining the device is in proximity of the second device and based on the comparison of the resource availability index of the first device to the resource availability index of the second device, relinquish control of at least one of the one or more communication sessions to the second device.

12. The device of claim 11, wherein to determine the device is in proximity of the second device, the one or more processors are configured to determine a signal strength of a signal received from the second device.

13. The device of claim 11, wherein to determine the device is in proximity of the second device, the one or more processors are configured to determine a round trip time for a signal sent to the second device.

14. The device of claim 11, wherein to determine the device is in proximity of the second device, the one or more processors are configured to determine a position of the device using a positioning system.

15. The device of claim 11, wherein the one or more processors are further configured to:
    send a message to the second device indicating the device is relinquishing control of the at least one of the one or more communication sessions to the second device.

16. The device of claim 11, wherein the one or more processors are further configured to:
    send a termination time to the second device.

17. The device of claim 11, wherein the one or more processors are further configured to:
    in response to determining the device is in proximity of the second device and determining a communication session with a first peripheral device is active, maintain control of the communication session with the first peripheral device after relinquishing control of a second peripheral device.

18. The device of claim 11, wherein the one or more processors are further configured to:
    in response to determining the device is out of proximity of the second device, reestablish a new communication session between the device and at least one of the one or more peripheral devices.

19. The device of claim 11, wherein the resource availability index of the second device is determined based on one or more of an indication of if the second device is plugged into a power supply, an amount of remaining battery life, memory availability, central processing unit (CPU) utilization, and available bandwidth of the second device.

20. The device of claim 11, wherein the device comprises at least one of:
    an integrated circuit;
    a microprocessor; or
    a wireless communication device.

21. The device of claim 11, wherein the device comprises a first wireless docking center (WDC), and wherein the second device comprises a second WDC.

22. A non-transitory computer-readable storage medium storing instructions that when executed by one or more processors cause the one or more processors to:
- maintain one or more communication sessions between one or more peripheral devices and a first device;
- determine if the first device is in proximity of a second device;
- receive from the second device a resource availability index;
- compare the resource availability index of the second device to a resource availability index of the first device;
- in response to determining the first device is in proximity of the second device and based on the comparison of the resource availability index of the first device to the resource availability index of the second device, relinquish control of at least one of the one or more communication sessions to the second device.

23. The non-transitory computer-readable storage medium of claim 22 storing further instructions that when executed by the one or more processors cause the one or more processors to:
- send a message to the second device indicating the first device is relinquishing control of the at least one of the one or more communication sessions to the second device.

24. The non-transitory computer-readable storage medium of claim 22 storing further instructions that when executed by the one or more processors cause the one or more processors to:
- send a termination time to the second device.

25. The non-transitory computer-readable storage medium of claim 22 storing further instructions that when executed by the one or more processors cause the one or more processors to:
- in response to determining the first device is in proximity of the second device and determining a communication session with a first peripheral device is active, maintain control of the communication session with the first peripheral device after relinquishing control of a second peripheral device.

26. The non-transitory computer-readable storage medium of claim 22 storing further instructions that when executed by the one or more processors cause the one or more processors to:
- in response to determining the first device is out of proximity of the second device, reestablish a new communication session between the first device and at least one of the one or more peripheral devices.

27. The non-transitory computer-readable storage medium of claim 22, wherein the resource availability index of the second device is determined based on one or more of an indication of if the second device is plugged into a power supply, an amount of remaining battery life, memory availability, central processing unit (CPU) utilization, and available bandwidth of the second device.

* * * * *